(12) United States Patent
Mallet et al.

(10) Patent No.: US 6,558,097 B2
(45) Date of Patent: May 6, 2003

(54) SCREW FASTENER

(75) Inventors: John Christopher Mallet, Moorabbin (AU); David Alexander Roberts, Moorabbin (AU)

(73) Assignee: ITW Australia Pty Ltd., Victoria (AU)

( * ) Notice: Subject to any disclaimer, the term of this patent is extended or adjusted under 35 U.S.C. 154(b) by 0 days.

(21) Appl. No.: 09/847,429

(22) Filed: May 3, 2001

(65) Prior Publication Data

US 2001/0038781 A1 Nov. 8, 2001

(30) Foreign Application Priority Data

May 3, 2000 (AU) .............................................. PQ7275

(51) Int. Cl.[7] .......................... F16B 23/00; F16B 35/06
(52) U.S. Cl. ..................... 411/399; 411/387.6; 411/404
(58) Field of Search .................... 411/387.6, 387.7, 411/399, 403, 404, 919

(56) References Cited

U.S. PATENT DOCUMENTS 5,199,839 A * 4/1993 Dehaitre ................ 411/399 X
5,683,217 A 11/1997 Walther et al.
5,772,376 A 6/1998 Konig
5,882,161 A * 3/1999 Birkelbach ............... 411/387.7
6,302,631 B1 * 10/2001 Takasaki et al. ............ 411/399

FOREIGN PATENT DOCUMENTS

AU 729658 8/1998

* cited by examiner

*Primary Examiner*—Neill Wilson
(74) *Attorney, Agent, or Firm*—Lowe Hauptman Gilman & Berner, LLP

(57) ABSTRACT

A screw fastener (10) including an elongate shank (11) having a longitudinal axis (A), a tip (12) at one end of the shank (11), a head (13) at the opposite end of the shank (11), and a self-tapping screw thread (14) extending along at least a major portion of the shank (11). The head (13) includes a generally planar end face (17) which is generally perpendicular to the longitudinal axis (A), and which includes means (18) for cooperation with a screw driver. The head (13) further includes boring means (15) that permits the head (13) to bore into a sheeting substrate (20). Control means (19) are provided for controlling the depth of penetration of the head (13) into the sheeting substrate (20).

11 Claims, 3 Drawing Sheets

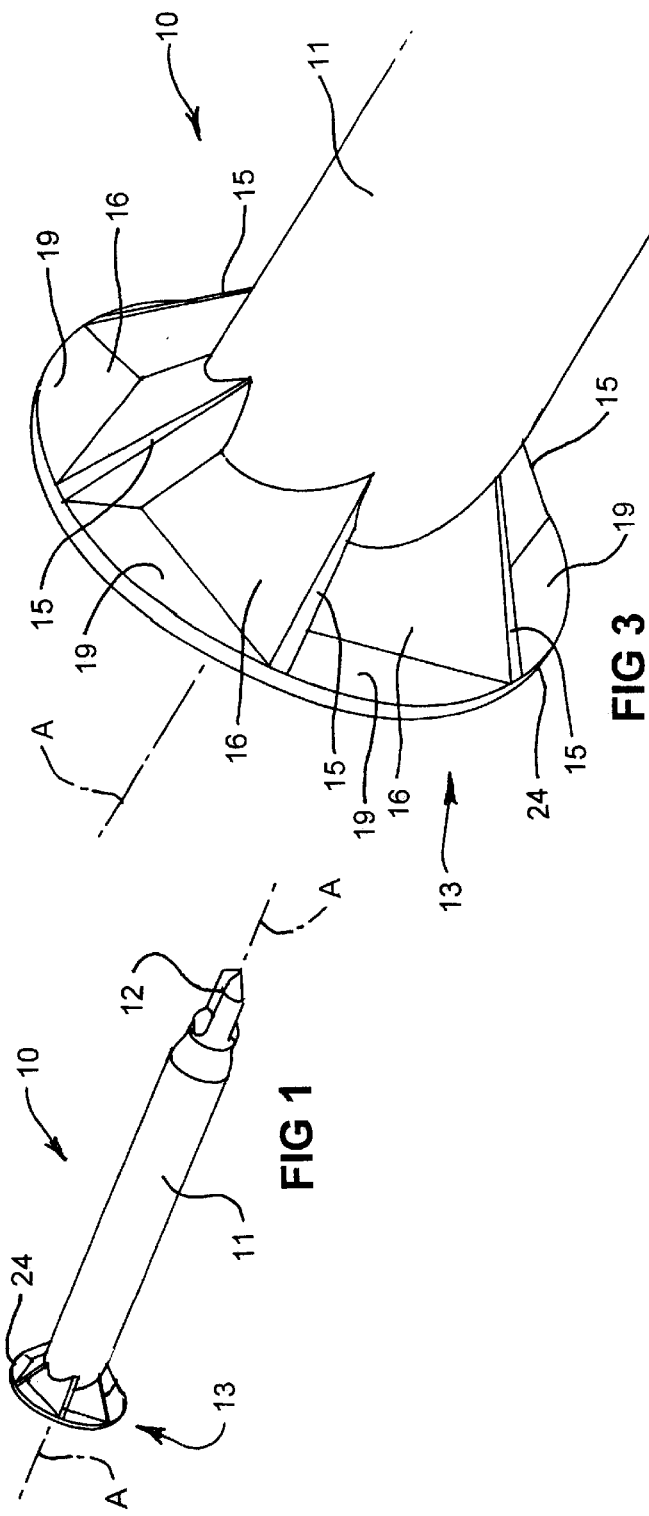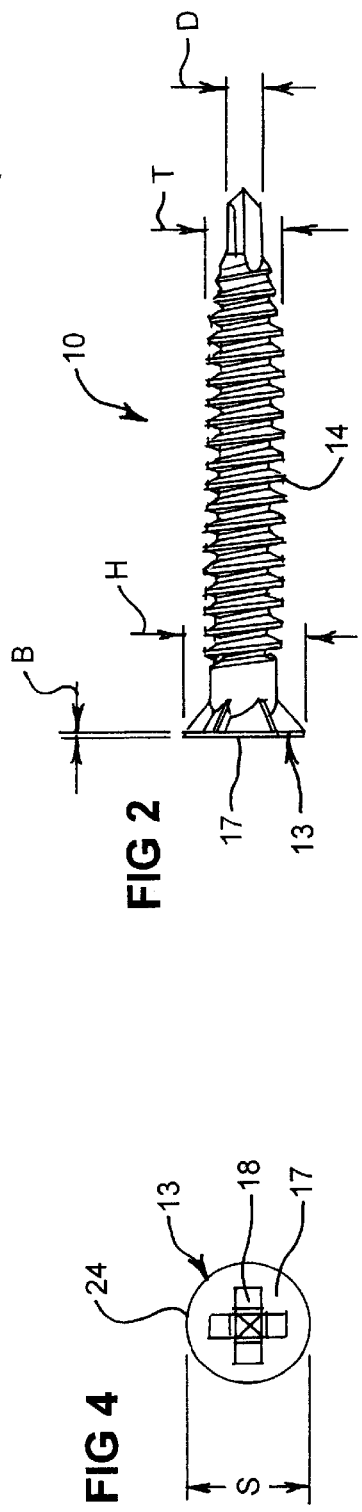

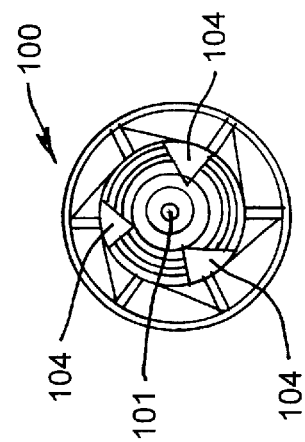
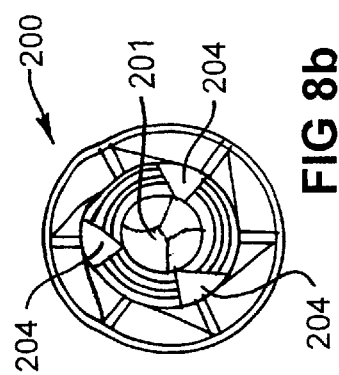
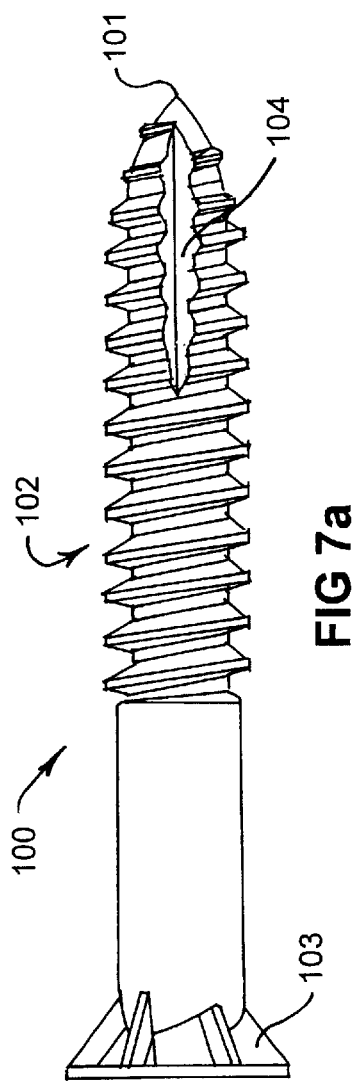
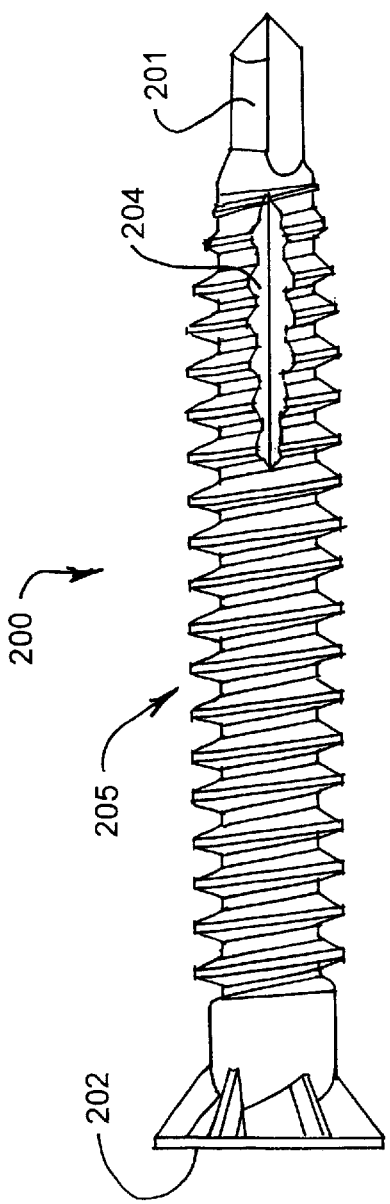

SCREW FASTENER

FIELD OF THE INVENTION

The present invention relates to a screw fastener for the fastening of non-metallic sheeting to a support. The invention has been developed principally for connecting fibre cement sheeting or the like, to metal battens or light gauge studs and it will therefore be convenient to describe the invention hereafter with reference to that particular application. It should however be appreciated that the invention has wider application and can for example, be applied to the application of fibre cement sheeting to a timber support.

BACKGROUND OF THE INVENTION

Fibre cement sheeting is commonly secured to metal battens with self-tapping threaded fasteners of the kind having a drilling tip formed at one end of a shank and a head formed at the opposite end. The screw fasteners are normally driven into the fibre cement sheeting with a powered driver and it is a drawback of the present fasteners, that the screw head often is driven to a position either proud of, or well below the outer or visible surface of the sheeting and is therefore not flush with that surface. This occurs because there is insufficient control relating to the penetration depth of the screw into the sheeting and generally occurs regardless of the experience of the operator.

No practical solution has been heretofor found to the above problem, which affects the finished appearance of the sheeting. In this respect, the sheeting surface is normally finished by painting, or by other suitable coverings, after it has been secured in place against the support and the existence of a screw head proud of the sheeting surface detracts from the surface finish and/or prevents proper attachment of suitable coverings thereto. Therefore, each head sitting proud of the sheeting surface has to be ground back to be flush with the sheeting surface. The existence of a screw head well below the sheeting surface leaves an exposed bore in the sheeting which has to be filled, such as with grout or putty, prior to finishing the sheeting surface. Such additional treatment described above is tedious and adds to the labour costs involved in the floor, ceiling or wall construction, and also delays completion of the construction. The existence of a screw head well below the sheeting surface also can cause damage to the fibre cement sheeting, such as by delamination, which requires additional repair.

OBJECT OF THE INVENTION

It is an object of the present invention to provide a screw fastener that overcomes or at least alleviates the above disadvantages of known screws. It is a particular object of the invention to provide a screw fastener that provides a level of control in relation to the depth of penetration of the screw into a sheeting substrate.

SUMMARY OF THE INVENTION

According to the present invention there is provided a screw fastener including an elongate shank having a longitudinal axis, a tip at one end of said shank, a head at the opposite end of said shank, and a self-tapping screw thread extending along at least a major portion of said shank, said head including a generally planar end face which is generally perpendicular to said longitudinal axis, and which includes means for cooperation with a screw driver, said head further including boring means that permits said head to bore into a sheeting substrate and control means for controlling the depth of penetration of said head into the sheeting substrate.

The control means can take any suitable form, but preferably is operative by increasing the torque required to drive the screw, to a level that causes the screw driver to cease driving the screw. This may be achieved in one form, in an arrangement in which the boring means includes a plurality of cutting edges disposed about the longitudinal axis of the screw fastener. The cutting edges extend at an angle from at or adjacent the shank in a direction away from the tip, to at or adjacent the outer edge periphery of the head and are separated by a flute or channel or the like, that extends towards the end face of the head, for removal of bored material (otherwise known as "swarf"). The head defines a control lip that extends between at least a pair of cutting edges and which prevents or at least substantially limits removal of bored sheeting material from between the pair of cutting edges, when the end face of the head reaches a position in which it is adjacent to or substantially flush with the outer surface of the sheeting. This is achieved by the control lip closely approaching or engaging the wall of the bored opening so as to substantially or fully close the passage between one or more pairs of cutting edges through which bored material is otherwise removed from the bored opening.

By preventing or substantially limiting removal of bored material from between a pair of adjacent cutting edges, that material is largely captured within the bore hole and it resists further penetration of the screw head into the sheeting material. Thus, the control lip bears against and compresses the bored material within the opening in the sheeting made by the boring means. That resistance to further penetration results in a greater torque being required to be applied to turn the screw, and the arrangement can be such that the increased torque reaches a level at which further drive of the fastener is prevented.

In the above arrangement, the screw driver can be of a known drill-type, with a screw head adaptor provided to cooperate with the head of the fastener to turn the fastener and upon reaching the increased torque level described above, the drill can either jam or the adaptor be released from engagement with the head. Alternatively, the screw driver may have a torque limiter that stops the driver from driving above a certain torque level.

In the above arrangement, the penetration of the head into the sheeting material can be controlled to suddenly stop penetration, advantageously providing accuracy and reliability in relation to the extent of head penetration. This is facilitated by the action of the fastener thread engaging the metal batten and requiring the fastener to penetrate the sheeting at a certain speed. That is, threaded engagement of the fastener with the batten constrains the fastener to move axially at a speed determined by the thread helix angle and the rotational speed of the drive. When axial penetration of the fastener into the sheeting is resisted by obstruction of the head, initially, any gap existing between the sheeting and the batten will be removed by the fastener drawing the sheeting and the batten together, whereafter the torque required to drive the fastener will rapidly, and in the preferred arrangement, effectively instantly increase.

The control lip of the invention preferably has a planar face that faces in the axial direction of the fastener toward the tip. The control lip preferably is formed on the undersurface of the end face of the head and preferably the edge periphery of the control lip is formed by the outer edge periphery of the head.

A control lip may extend between only a single pair of cutting edges, but preferably a control lip extends between more than a single pair and most preferably between each pair of cutting edges. In a preferred arrangement, the boring means includes at least four cutting edges, but preferably six and the control means therefore preferably includes respectively four or six control lips.

The or each control lip can be axially spaced from the end face any suitable distance to ensure that in use, the end face is positioned substantially flush with the sheeting surface when the control means operates to prevent further penetration of the head into the sheeting material. The spacing will take into account any further travel of the head into the sheeting, once the or each control lip is operative to commence restriction on further penetration of the head into the sheeting material, such as when the control lip has entered or is adjacent the mouth of the bored opening. That further travel may occur as the bored material is compressed by the control lip into the bored opening. In one arrangement, the spacing between the end face and the control lip is in the region of less than 1 mm.

In an alternative embodiment, the radial extent of the cutting edges may be less than the radial extent of the outer edge periphery of the end face and the control means may be formed by an underneath surface of the head opposite the end face that extends radially beyond the cutting edges. In this arrangement, the head will penetrate into the sheeting material, boring an opening of a radius equal to the maximum radial extent of the cutting edges. The control means will thereafter limit penetration of the head into the sheeting material, by engaging the surface of the sheeting material around the bore opening.

In the above arrangement, engagement of the control means with the surface of the sheeting material under a driving force will cause the sheeting material to compress and with a suitable material, the level of compression will be sufficient to embed the head in the material so that the end face thereof is substantially flush with the sheeting surface. This arrangement is not however suitable for all types of sheeting material, in particular those having low levels of compressibility.

The invention advantageously facilitates accurate positioning of the end face of the fastener head substantially flush with the outer surface of the sheeting material, so that there is no requirement for further treatment of the sheeting surface by grinding or filling, although in the event that the sheeting surface is to remain visible, i.e. it is not to be covered after fixing to the batten or stud, it may be necessary, or just desirable to fill any slight depression caused by compression of the sheet material by the screw fastener. The screw fastener of the invention advantageously requires no special skills to achieve the desired flush installation and can be installed with equipment presently used to install known screw fasteners. It is therefore considered that the invention provides significant advantages over such known screw fasteners.

BRIEF DESCRIPTION OF THE DRAWINGS

The attached drawings show example embodiments of the invention of the foregoing kind. The particularity of those drawings and the associated description does not supersede the generality of the preceding broad description of the invention.

FIG. 1 illustrates a screw fastener blank embodying certain features of the invention.

FIG. 2 illustrates the screw fastener blank of FIG. 1, with a self-tapping thread formed along the shank thereof.

FIG. 3, shows the head of FIG. 2 in greater detail.

FIG. 4, is an end view of the screw fastener head of FIG. 2.

FIG. 7a illustrates an alternative screw fastener according to the invention which is suitable for penetration of a timber support.

FIG. 7b is an end view of the drilling tip of the screw fastener of FIG. 7a.

FIG. 8a illustrates an alternative screw fastener according to the invention which is suitable for penetration of a metal support.

FIG. 8b is an end view of the drilling tip of the screw fastener of FIG. 8a.

DETAILED DESCRIPTION

Figure 5:
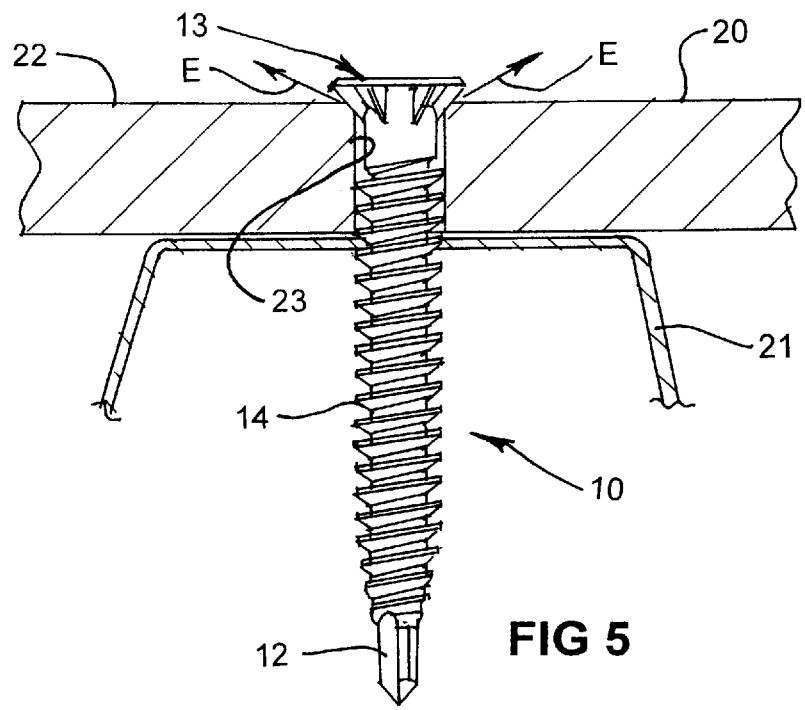
FIGS. 5 and 6 show different stages of screw fastener penetration into a fibre cement sheeting.

FIG. 1 shows a blank 10 for a screw fastener according to one embodiment of the present invention. The screw blank 10 has an elongate shank 11, and is partly formed into a screw, with a drilling tip 12 formed at one end of the shank and a head 13 formed at the opposite end. The blank 10 is arranged to have a self-tapping thread formed along a major portion of the shank 11 and that thread is normally formed in a thread rolling operation, although it could be formed by other operations, such as a grinding operation. Such a screw thread is shown in FIG. 2. The thread 14 can have any suitable thread formation and a particularly preferred formation is disclosed in Applicant's co-pending Australian application 53013/98. The text of that application is therefore incorporated herein by cross-reference.

The drilling tip 12 shown in FIGS. 1 and 2 can have any suitable configuration that permits it to drill through a sheeting material and a support, such as a metallic batten or stud, to which the sheeting is to be secured by the screw fastener. A screw fastener of the present invention typically is designed for connecting fibre cement sheeting to a metal batten and the drilling tip is principally constructed for penetration of the batten, as a drilling tip of almost any kind will easily penetrate through the sheeting. The tip may alternatively have a configuration suitable for penetrating a timber support and such a tip is shown in FIGS. 7a and 7b, which are discussed later.

A drilling tip appropriate for drilling through metal can have substantially the same characteristics in terms of shape and function as the end of a conventional drill bit for drilling metal. The drilling tip illustrated is unthreaded and it includes a pair of straight flutes disposed on opposite sides of the tip axis. A tip of this kind will penetrate the sheeting material quickly and without difficulty. The tip will then engage the metal batten and with endwise pressure applied to the screw head, an opening will be drilled in the batten. Endwise pressure on the screw head will bring the self tapping thread 14 into threaded engagement with the batten and the screw 10 will be drawn through the batten (and therefore also through the sheeting) by continued rotation of the screw.

The drilling tip 12 will bore an opening in both the sheeting material and the batten, of substantially a diameter D. Penetration of the thread 14 into the sheeting material will enlarge that opening to the major diameter T of the thread 14.

FIG. 3 shows the head 13 in more detail and in this view, boring means, in the form of a plurality of cutting edges 15, are shown disposed about the longitudinal axis A of the screw fastener 10 and extending from the shank 11, in a direction outwardly and away from the drilling tip 12. The cutting edges 15 define between them channels or flutes 16 and these permit the collection and disposal of swarf when the cutting edges are boring through sheeting material. The cutting edges bore into the sheeting material and enlarge the diameter of part of the opening in the sheeting material from the diameter T to the diameter H, which is substantially equal to the maximum radial extent of the cutting edges 15.

The head 13 has an end face 17 (see FIGS. 2 and 4) in which is formed suitable means for cooperating with a screw driver and in FIG. 4, a cross-recess 18 is shown. The undersurface of the end face 17 is formed to define a plurality of control lips 19 which extend between adjacent cutting edges 15 and which have a radial extent substantially equal to the diameter S of the screw head 10 (see FIG. 4). Each of the control lips 19 axially closes a respective flute 16, so that when the screw head 13 has penetrated into the sheeting material to the extent that the control lips are adjacent the surface of the sheeting, further removal of bored sheeting material or swarf from the opening is severely limited or fully prevented.

Figure 6:
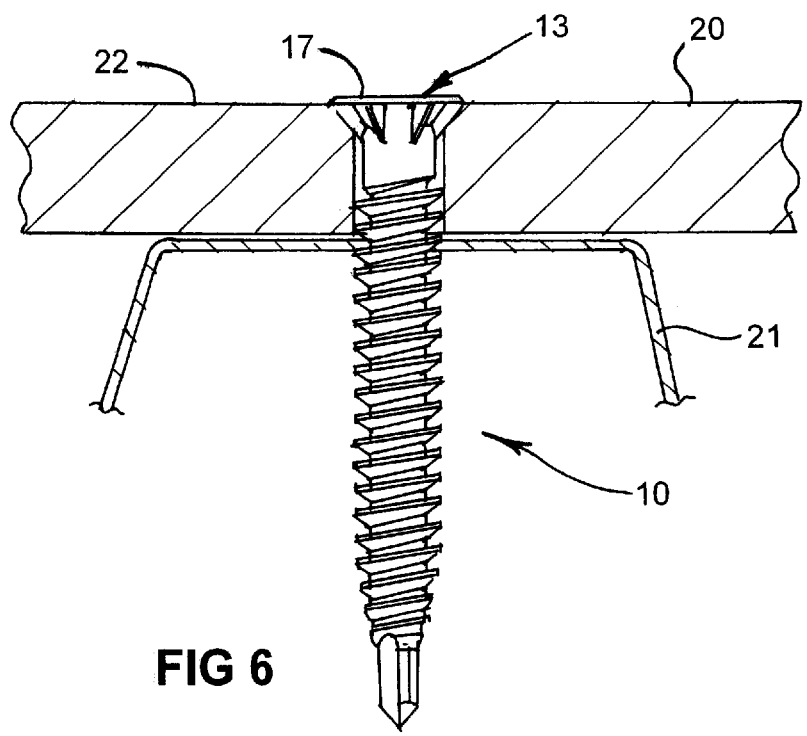

FIGS. 5 and 6 show two stages of screw penetration, in which the screw fastener 10 is being used to secure fibre cement sheeting 20 to a metal batten 21. In FIG. 5, both the drill tip 12 and the thread 14 have penetrated both the sheeting 20 and the batten 21, but only to the extent that the head 13 has partly penetrated into the sheeting 20. That penetration, and continued penetration, is possible by the boring action of the cutting edges to enlarge the opening 23 formed by the drilling tip 12 and the thread 14. The material removed from the sheeting 20 by the cuffing means can be via the flutes 16 (see FIG. 3) as shown by the arrows E in FIG. 5.

In FIG. 6, the screw fastener 10 has penetrated further into the sheeting 20 to the point at which the head 13 is substantially flush with the outer surface 22. In that position, the control lips 19 (see FIG. 3) have closed over the mouth of the opening 23, so as to prevent further removal of bored material. Thus, material that continues to be removed by boring is captured within the opening 23.

Continued rotation of the screw 10 in threaded engagement with the batten 21 requires the screw to move axially and further penetrate into the sheeting. That is, for each full rotation of the screw 10, the screw will be constrained to move axially into the sheeting an amount equal to the thread pitch. However the boring means largely is prevented from further enlarging the opening 23 by the control lips 19 preventing removal of bored material. In these circumstances, one of two things will happen. Either the thread 13 will strip the opening in the batten 21, or the screw driver will stop driving the screw. Tests have revealed that with sheet metal having a thickness in the range 0.4 mm to 0.8 mm, the latter will occur, either by the screw driver jamming, or by it releasing from engagement with the head 13.

The above described mechanism for limiting the penetration of a screw fastener into sheeting material has been shown in testing to have extremely positive results. In particular, test screws have consistently penetrated to a position in which the end face 17 of the screw is substantially flush with the outer surface 22 of the sheeting 20. Moreover, these positive results have been achieved by unskilled operators with no knowledge as to how to control the final position of the head within the sheeting. It is quite apparent therefore, that the invention has significant advantages over prior art screws.

It will be appreciated that the control means can be configured or positioned in any suitable manner to control penetration of the screw head. In the FIG. 6 arrangement, the end face 17 is shown slightly proud of the outer surface 22, but the head 13 will penetrate slightly further into the sheeting 20 through compression of the bored material captured in the opening 23 and/or of the sheeting itself. The extent of further penetration into the sheeting 20 upon closure of the opening 23 by the control lips 19 will govern the thickness B (FIG. 2) of the peripheral edge 24 (FIGS. 1, 3 and 4) of the head, so that the end face 17 will be finally positioned either flush, or acceptably close to flush, with the outer surface 22. Thus, the thickness B may vary depending on the type of sheeting material the screw 10 is required to penetrate. Other constructional changes to the boring means and the control means may be employed to control the depth of penetration of the screw head 13 into the sheeting 30.

In each of the drawings, the control lips 19 are shown to have a maximum radial extent about equal to the maximum radial extent of the cutting edges 15. It would be a simple matter however, to enlarge the diameter of the peripheral edge 24, and thus the radial extent of the control lips 19, beyond the maximum radial extent of the cutting edges 15, so that the control lips 19 would engage the outer surface 22 of the sheeting 20 and so prevent further penetration of the screw fastener 10 into the sheeting 20 upon that engagement. The mechanism of such a construction would therefore differ from the mechanism of the screw fastener 10 illustrated in the drawings, in as much as the confinement of bored material within the opening 23 is not critical. That confinement will nevertheless occur by closure of the control lip over the mouth of the opening 23 (assuming the control lip extends fully circumferentially), but confinement is not the mechanism by which the required torque is increased.

FIGS. 7a and 7b show a screw fastener 100 which has a tip 101 intended to penetrate into a timber support. The screw fastener 100 includes a threaded shank 102 and a head 103. The head 103 as shown, is the same configuration as the head 13 of the screw fastener 10. The screw fastener 100 differs from the fastener 10 by virtue of the tip 101 and the inclusion of a flute 104 extending through the thread.

The flute 104 is provided to assist the screw 100 to bore into the sheeting and the timber support and a single flute may be provided, or more preferably, two or three such flutes may be provided equidistantly about the circumference of the shank of the screw. An arrangement having two flutes 104 is illustrated in the end view of the screw fastener 100 shown in FIG. 7b.

FIGS. 8a and 8b illustrate a screw fastener 200 which has a tip 201 of the kind illustrated previously in relation to the screw fastener 10. Likewise, the head 202 is the same as the head 13 of the screw fastener 10. A flute 204 is provided extending through the thread of the threaded shank 205 to provide the same benefit as described above. In this arrangement, and as shown in FIG. 8b, three flutes 204 are provided.

The invention described herein is susceptible to variations, modifications and/or additions other than those specifically described and it is to be understood that the invention includes all such variations, modifications and/or additions which fall within the spirit and scope of the above description.

What is claimed is:

1. A screw fastener, comprising an elongate shank having a longitudinal axis, a tip at one end of said shank, a head at the opposite end of said shank, and a self-tapping screw thread extending along at least a major portion of said shank; said head including:
   a generally planar end face which is generally perpendicular to said longitudinal axis, and which is adapted to be engaged with and driven by a screw driver;
   a plurality of cutting edges disposed about the longitudinal axis of said fastener shank for permitting said head to bore an opening into a sheeting substrate, said cutting edges extending at an angle from at or adjacent said shank in a direction away from said tip, to at or adjacent an outer edge periphery of said head, and each pair of adjacent said cutting edges being separated by a flute that extends towards said end face and through which permits removal of bored material from the opening in the sheeting substrate; and
   a control lip for controlling the depth of penetration of said head into the sheeting substrate, said control lip extending between at least a pair of adjacent said cutting edges, said control lip being adapted to engage the sheeting substrate and, by that engagement, to increase the torque required to drive said fastener to a level that causes the screw driver to cease driving said fastener;
   wherein the maximum radial extent of said cutting edges is less than the radial extent of said outer edge periphery of said head, such that in use, the diameter of the opening bored by said cutting edges is less than said outer edge periphery and said control lip engages an outer surface of the sheeting substrate about the opening to increase said required torque.

2. A screw fastener according to claim 1, said control lip having a planar face that faces in the axial direction of said fastener towards said tip.

3. A screw fastener according to claim 2, said planar face being formed on the undersurface of said head opposite to said end face.

4. A screw fastener according to claim 3, said planar face being spaced from said end face an amount in the region of less than 1 mm.

5. A screw fastener according to claim 1, including a control lip extending between at least two pairs of cutting edges.

6. A screw fastener according to claim 1, including a control lip extending between each pair of cutting edges.

7. A screw fastener according to claim 1, comprising four said cutting edges disposed equidistantly about said head and four said control lips.

8. A screw fastener according to claim 1, comprising six said cutting edges disposed equidistantly about said head and six said control lips.

9. A screw fastener according to claim 1, wherein said tip is a drilling tip for drilling through metal.

10. A screw fastener according to claim 1, wherein said tip is a drilling tip for drilling through timber.

11. A screw fastener according to claim 1, further comprising one or more grooves provided longitudinally through said screw thread.

* * * * *